(12) United States Patent
Ashner et al.

(10) Patent No.: US 10,063,632 B1
(45) Date of Patent: Aug. 28, 2018

(54) LOW-LATENCY HIGH-THROUGHPUT SCALABLE DATA CACHING

(71) Applicant: Engine Media, LLC, Princeton, NJ (US)

(72) Inventors: Louis Clayton Ashner, New York, NY (US); Mickey Alexander Schwab, Chicago, IL (US); Michael Zacharski, Pawling, NY (US); John Patrick Roach, New York, NY (US)

(73) Assignee: ENGINE MEDIA, LLC, Princeton, NJ (US)

( * ) Notice: Subject to any disclaimer, the term of this patent is extended or adjusted under 35 U.S.C. 154(b) by 0 days.

(21) Appl. No.: 15/853,366

(22) Filed: Dec. 22, 2017

(51) Int. Cl.
*G06F 15/16* (2006.01)
*H04L 29/08* (2006.01)
*G06F 17/30* (2006.01)
*G06F 9/455* (2018.01)

(52) U.S. Cl.
CPC .... *H04L 67/1002* (2013.01); *G06F 17/30002* (2013.01); *H04L 67/02* (2013.01); *H04L 67/2842* (2013.01); *G06F 9/45558* (2013.01)

(58) Field of Classification Search
CPC ............................ G06Q 30/0275; G06Q 30/08
See application file for complete search history.

(56) References Cited

U.S. PATENT DOCUMENTS

| 7,325,097 | B1 * | 1/2008 | Darcy ................... G06F 3/0622 709/208 |
| 8,831,987 | B2 | 9/2014 | Knapp et al. |
| 8,983,859 | B2 | 3/2015 | Nice et al. |
| 8,983,860 | B1 * | 3/2015 | Beda, III ........... G06Q 30/0275 705/14.49 |
| 9,817,877 | B2 * | 11/2017 | Taranov ............ G06F 17/30569 |
| 9,832,128 | B1 * | 11/2017 | Ashner ................. H04L 47/125 |
| 2004/0075552 | A1 | 4/2004 | Rao et al. |
| 2008/0065479 | A1 | 3/2008 | Tomlin et al. |
| 2008/0228564 | A1 | 9/2008 | de Heer et al. |
| 2009/0187705 | A1 * | 7/2009 | Bernardi ............... G06F 3/0613 711/112 |
| 2010/0145809 | A1 | 6/2010 | Knapp et al. |
| 2011/0040635 | A1 | 2/2011 | Simmons et al. |

(Continued)

OTHER PUBLICATIONS

B. Levine, Ad Exchange bRealTime Launches Biddr+ for Header Bidding, Jan. 19, 2017.

(Continued)

*Primary Examiner* — Hieu Hoang
(74) *Attorney, Agent, or Firm* — K&L Gates LLP

(57) ABSTRACT

Low-latency high-throughput scalable data caching is disclosed. For example, a data source is connected over a network to a load balancer server with data cache. A load balancer service and a data cache service execute on processors on the first load balancer server to receive, by the load balancer service, a request from a client device over the network. The load balancer service requests a data entry associated with the request from the first data cache service. The data cache service retrieves the first data entry from the first data cache, which stores a first plurality of data entries that is a subset of a second plurality of data entries stored in the data source. The load balancer service modifies the request with the data entry. The load balancer service sends a modified request to a plurality of receivers.

29 Claims, 8 Drawing Sheets

(56) References Cited

U.S. PATENT DOCUMENTS

| | | | |
|---|---|---|---|
| 2012/0310729 A1* | 12/2012 | Dalto | G06Q 30/02 705/14.43 |
| 2013/0066705 A1 | 3/2013 | Umeda | |
| 2013/0225176 A1 | 8/2013 | Kurabayashi et al. | |
| 2014/0006170 A1 | 1/2014 | Collette et al. | |
| 2014/0058849 A1 | 2/2014 | Saifee et al. | |
| 2015/0051986 A1 | 2/2015 | Saifee et al. | |
| 2015/0112811 A1 | 4/2015 | Connors et al. | |
| 2015/0120468 A1 | 4/2015 | Knapp et al. | |
| 2015/0154650 A1 | 6/2015 | Umeda | |
| 2015/0310500 A1 | 10/2015 | Nolet et al. | |
| 2015/0310512 A1* | 10/2015 | Malaksamudra | G06Q 30/04 705/34 |
| 2016/0036835 A1 | 2/2016 | Lietz et al. | |
| 2016/0080259 A1* | 3/2016 | Biancaniello | H04L 45/74 709/203 |
| 2016/0217150 A1* | 7/2016 | Davis | G06F 17/30179 |
| 2016/0292047 A1* | 10/2016 | Bender | G06F 17/30221 |
| 2016/0352827 A1* | 12/2016 | Procopio | H04L 67/1095 |
| 2017/0235950 A1* | 8/2017 | Gopalapura Venkatesh | G06F 8/65 726/24 |
| 2018/0074714 A9* | 3/2018 | Zohar | G06F 3/065 |
| 2018/0075083 A1* | 3/2018 | Lee | G06F 17/30377 |

OTHER PUBLICATIONS

Amazon Web Services, Advertising Serving, May 2012.

Amazon Web Services. Building a Real-Time Bidding Platform on AWS, Feb. 2016, https://d0.awsstatic.com/whitepapers/Building_a_Real_Time_Bidding_Platform_on_AWS_v1_Final.pdf.

Amazon Elastic Compute Cloud, User Guide for Linux Instances, pp. 706-721, http://docs.aws.amazon.com/AWSEC2/latest/UserGuide/ec2-ug.pdf, downloaded Mar. 21, 2017.

* cited by examiner

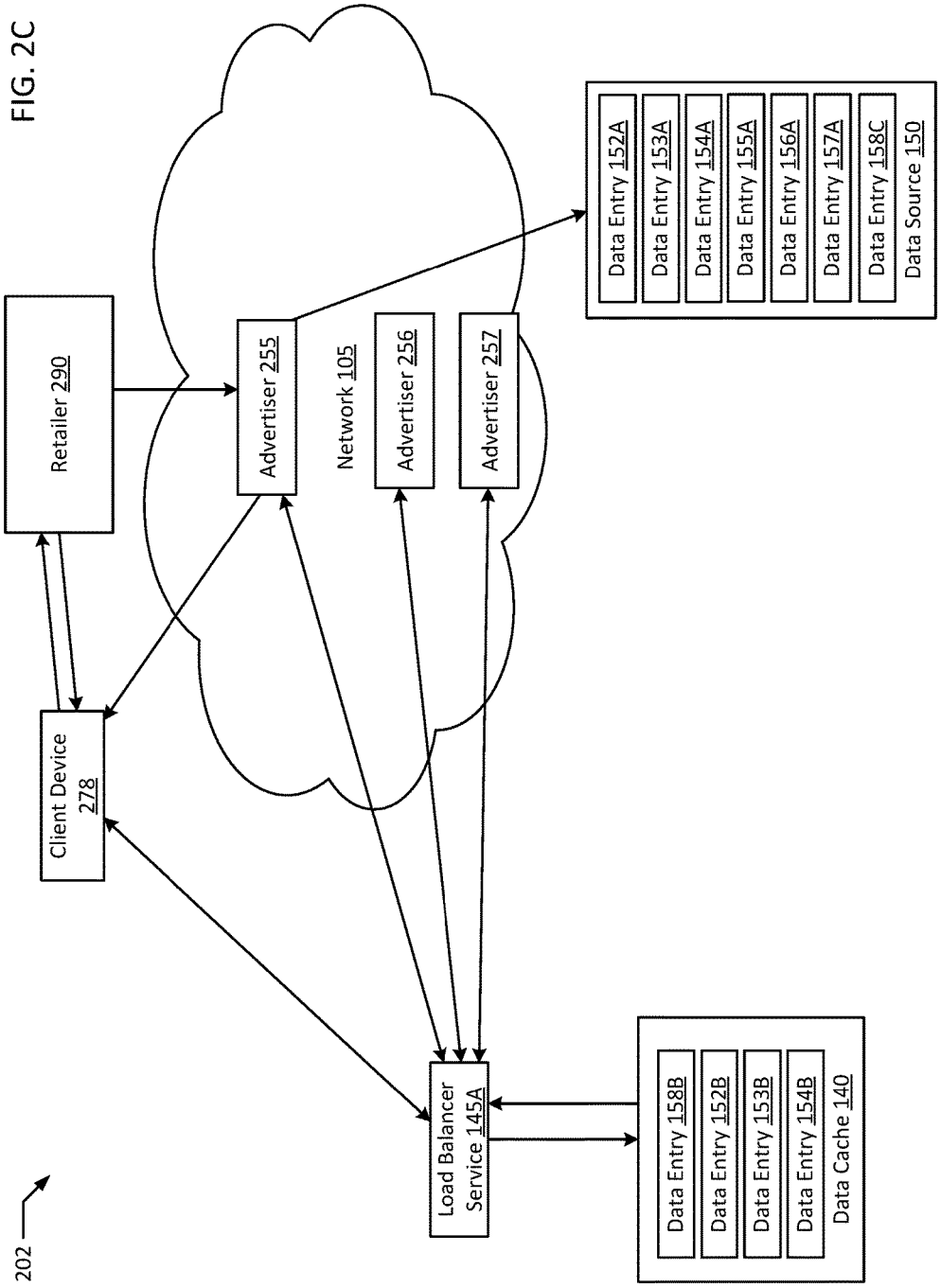

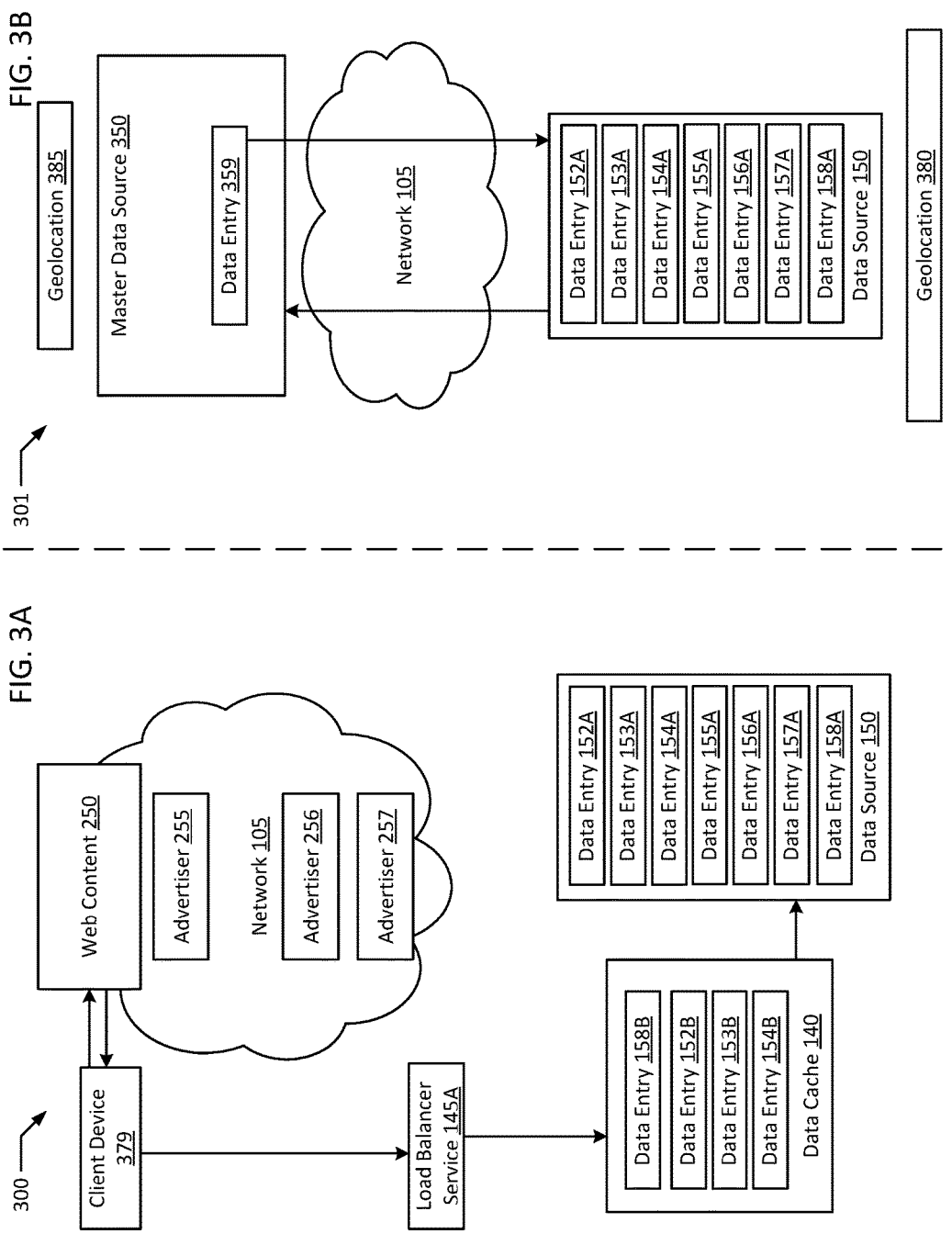

US 10,063,632 B1

LOW-LATENCY HIGH-THROUGHPUT SCALABLE DATA CACHING

BACKGROUND

The present disclosure generally relates to content delivery to network accessible devices such as the delivery of advertisements and alerts. As microprocessors have become more efficient, and network connectivity more prevalent, an ever increasing amount of devices now have internet or intranet enabled capabilities and features. With the network capabilities of network accessible devices, come opportunities for users to consume content, and therefore demand for publishers of content to provide content to these users. Content providers, including advertisers are presented with ever increasing opportunities to reach their increasingly accessible consumers through a myriad of network accessible devices used by these consumers on a daily basis. Consumers typically favor content providers with optimized user experiences, including low-latency delivery of content. Improving the speed and reliability of content delivery across a network is important for providing consumers using network accessible devices with a satisfactory user experience.

SUMMARY

The present disclosure provides a new and innovative system, methods and apparatus for low-latency high-throughput scalable data caching. In an example, a system comprises a data source connected over a network to a plurality of load balancer servers including first and second load balancer servers, where each load balancer server of the plurality of load balancer servers has a respective data cache, including a first data cache of the first load balancer server and a second data cache of the second load balancer server. A load balancer service and a data cache service execute on one or more processors on the first load balancer server to receive, by the load balancer service, a request from a client device over the network. The load balancer service requests a data entry associated with the request from the first data cache service. The data cache service retrieves the first data entry from the first data cache, which stores a first plurality of data entries that is a subset of a second plurality of data entries stored in the data source. The load balancer service modifies the request with the data entry. The load balancer service sends a modified request to a plurality of receivers.

Additional features and advantages of the disclosed method and apparatus are described in, and will be apparent from, the following Detailed Description and the Figures.

BRIEF DESCRIPTION OF THE FIGURES

FIGS. 2A-C are block diagrams of an advertisement bidding system enhanced by a low-latency high-throughput scalable data caching system according to an example of the present disclosure.

FIGS. 3A-C are block diagrams of a low-latency high-throughput scalable data caching system responding to a request for non-cached data according to an example of the present disclosure.

DETAILED DESCRIPTION OF EXAMPLE EMBODIMENTS

Figure 1:
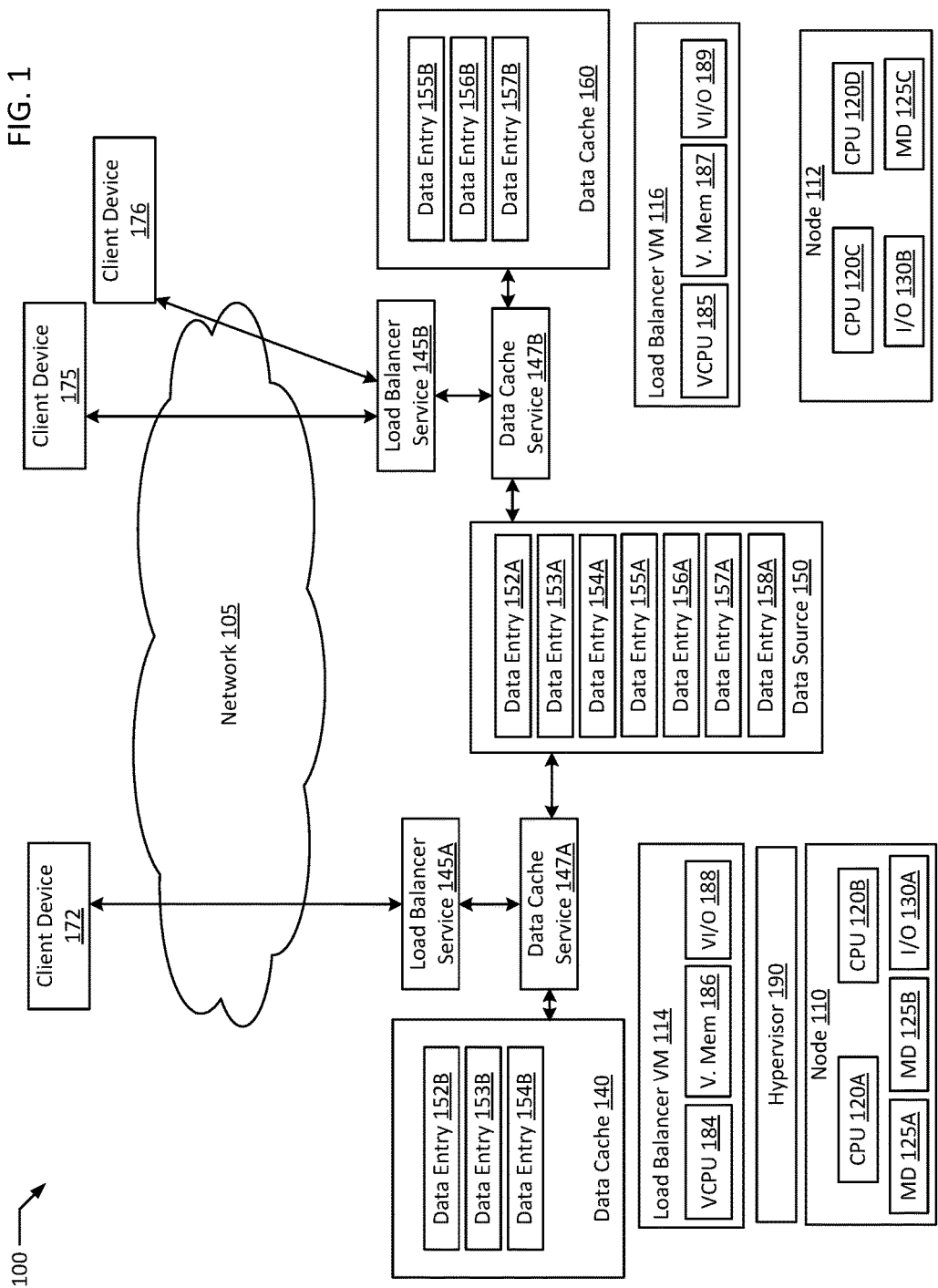
FIG. 1 is a block diagram of a system performing low-latency high-throughput scalable data caching according to an example of the present disclosure.

As network accessible devices increasingly gain popularity, content consumption on such devices increases, resulting in people using network accessible devices becoming more informed than ever. These network accessible devices also offer a platform for delivering content to a large audience, from world news and natural disasters, to local show times, concert tickets going on sale, viral videos, social media alerts, and securities prices. Such network retrieved content may typically be monetized through advertising. With the vast variety of devices capable of presenting audio and visual advertisements ("ads"), comes numerous opportunities to deliver ads to content consumers, and also competition for the advertising opportunities or ad impressions.

Typically, a publisher serving content may coordinate with advertisers using a bidding process to display ads in content served to consumers of the publisher's content. A page of content, such as a web page on a web site, may include multiple ad slots where ads may be displayed. In an example, each ad slot, when loaded to a client device and viewed by a user of the client device may result in an ad impression. An ad impression may be an opportunity for an advertiser to reach a given user at a given time, and therefore each time a user loads a given page of content, and/or each time a different user loads the page of content, each ad slot on the page may become a new ad impression. In an example, a publisher may therefore request for advertisers to bid on each ad impression to maximize the value of each respective ad impression. For advertisers, ad agencies, and/or ad exchanges, response time to requests for bids on ad impressions may therefore be critical for maximizing both the likelihood of securing an ad impression as well as the effectiveness of a given ad impression. As users typically expect perceivably immediate responses when accessing content online, the entire process for negotiating, selecting, and displaying an ad may typically be completed in under one second. In a typical day, billions of ads may be served to consumers on network accessible devices. Publishers may be incentivized to maximize the advertisers bidding on each of their ad impressions to generate maximum value from each impression.

In a typical advertising exchange implementation, a user on a network accessible client device may access content supplied by a publisher. The publisher may incorporate ad slots in the content, and then seek prospective buyers (e.g., advertisers) for the ad impressions in the content in real-time while the content is loading, for example, by broadcasting an ad request for each ad slot loaded to the client device as an ad impression. An ad agency may, upon receipt of a request to bid on a given ad slot, seek advertisers either directly or through an advertising exchange to purchase the ad slot. For example, header bidding may be a typical implementation by which publishers and ad agencies request bids for and subsequently serve advertisements. A typical header bidding implementation may be based on the open source project Prebid.js where a typical request for bids on an ad slot may be in the form of a hypertext transfer protocol ("HTTP") GET request with query string parameters related to the particular ad slot, such as a tag id, a referrer, and a size of the ad impression. For example, a header bidding request may be in the form of a Uniform Resource Locator ("URL") without an additional message payload such as, http://www.example.com/getBid?tagid=55&referrer=mysite.com&width=300&height=250. In an example, an HTTP header associated with a request may include additional information pertinent to the request, such as User Agent, Content Type, Content Length, etc. In an example, requests for bids on an ad slot may also be in the form of an HTTP POST request. For example, in implementations based on the open source project OpenRTB, a bid may be in the form of an HTTP POST request with a JavaScript Object Notation ("JSON") payload. A typical JSON payload for an ad slot bid may include attribute-value pairs conveying information regarding the particular ad slot, such as, {"tagid"; "55", "referrer": "mysite.com", "dimensions": {"width": "300", "height": "250"}}. In various examples, different publishers and advertisers may implement different preferred formats of advertisement requests.

In an example, to maintain a positive user experience for the content, a publisher may require response from potential advertisers, ad agencies, and/or ad exchanges within a certain critical time threshold. In the example, network latency may account for a significant proportion of the time spent handling a given request. Another significant source of latency may be the time a downstream actor (e.g., an advertiser seeking to advertise through an ad exchange) takes to respond to a given request. Some sources of latency may typically be outside of the control of a given actor. In an example, a balance may be struck between how many advertisers each ad impression is shopped to by a publisher and the resulting latency from waiting for responses from each advertising partner. In a typical example, an entire ad auction may be completed in under 500 ms, with winning bidders typically responding within 100 ms.

In a typical implementation, an ad agency soliciting bids for a given ad impression may enrich a request for bids from a client device and/or a publisher of content with user specific information related to a user of the client device. For example, the user may have a user profile collected through data gathering systems and techniques, such as web cookies tracking the user's online history, and surveys helping better target the user's preferences. In a typical system, an ad agency may store user profiles in centralized databases that may then be queried to enrich a given ad request with profile data, which may in turn influence the bidding on the ad impressions for that user based on, for example, demographic data and historical shopping data. In a typical example, a query to a centralized relational database located in the same datacenter as a data enrichment load balancer service performing for a user profile may retrieve profile data in 10-100 ms. While objectively fast, such queries may represent a significant amount of the total response time in an advertisement bidding cycle of under 100 ms.

The present disclosure aims to address the added latency resulting from centralized data storage by implementing low-latency high-throughput scalable data caching. In an example, an advertising service may store user profiles of millions of users to best target ads for each individual user. Storing such records centrally may typically incur upwards of 30-100 ms of latency to access the records, both due to network latency as well as search latency from such a large database. In the example, by implementing a data cache with the profile data on the same server as a load balancer with an auction module, the network latency is reduced by several orders of magnitude down to well under one millisecond. Search times may be significantly reduced as well, for example, down to the 1 ms range by limiting the records in these data caches to a total size that may be hosted in fast memory (e.g., direct access memory or persistent memory). In an advertising setting, for the vast majority of users, access will be highly correlated with a home or office location, and therefore primary selection for where to cache a particular user's profile data may be well correlated with a geographical region from which that user typically accesses network content. Therefore, in most scenarios, a particular user profile needs only to be cached in a couple of locations where access is likely, and may be eliminated from other nodes around the world, resulting in a natural reduction in the data stored in each data cache. In addition, individual records tend to be very small and quickly retrievable, while often times one request is followed by numerous other requests. Therefore, a first request may often be an effective trigger in determining the proper data to cache for follow-on requests. A retention time limit for individual records may also be maintained on a data cache level, where a given record may be removed from a data cache after a certain amount of time without being accessed. In an example, a master copy of the data entry may still be retrieved at any time from a data source.

FIG. 1 is a block diagram of a system performing low-latency high-throughput scalable data caching according to an example of the present disclosure. In an example, illustrated system 100 depicts the various key parties in a given content delivery system. For example, client devices 172, 175, and 176 may be any form of network accessible device (e.g., phone, tablet, laptop, desktop, server, Internet of Things ("IOT") device, etc.). These devices may access network content over network 105 which may be any type of network, for example, a public network (e.g., the Internet), a private network (e.g., a local area network (LAN) or wide area network (WAN)), or a combination thereof. In an example, devices connected through network 105 may be interconnected using a variety of techniques, ranging from a point-to-point processor interconnect, to a system area network, such as an Ethernet-based network. In the example, load balancer services 145A-B may be associated with any form of content distributor, such as a publisher of content, an advertiser, or some form of intermediary such as an advertisement exchange or auction service.

In an example, load balancer 145A is collocated with data cache 140. For example data cache 140 may take the form of a database, containing data entries (e.g., data entries 152B, 153B, 154B). In an example, data cache 140 may be implemented on a physical or virtual device configured with memory devices to host a plurality of data entries (e.g., data entries 152B, 153B, 154B). In an example, data cache 140 may be segregated into different cache data stores, for example, hosting data entries associated with different content distributors (e.g., different publishers). In various examples, data entries 152B-154B may be associated with different entities. For example, where load balancer service 145A is associated with a video streaming service, data entries 152B-154B may be individual videos. In another example, where load balancer service 145A is associated with an ad agency offering ad auction services, data entries 152B, 153B, and 154B may be user profiles, for example, data entry 152B may be a user profile of a primary user of client device 172. In an example, load balancer service 145A may be one of multiple copies of load balancer service 145A (e.g., load balancer services 145A-B) hosted in a given data center hosting nodes 110 and 112 of system 100. In an example, a given node (e.g., node 110 or node 112) may host multiple copies of load balancer service 145A, for example, for increased parallel processing.

In an example, data caches 140 and 160 may be associated with data source 150, which may be a data store with copies of most or all of the data entries (e.g., data entries 152A-159A) maintained by an entity associated with load balancer services 145A-B. In an example, data entries 152B-154B and 155B-157B may be additional copies of source data entries 152A-157A (and data entry 158A may be a data entry that is not currently cached). In an example, data cache services 147A-B may be interfaces through which load balancer services 145A-B may access data caches 140 and 160. In an example, data source 150 may also include a subset of data entries maintained by the entity operating load balancer services 145A-B. For example, data source 150 may have geographically curated data associated with data entries for users and/or client devices (e.g., client devices 172, 175, and 176) that typically access content in the same geographical region as data source 150.

In an example, data source 150 and data caches 140 and 160, may be any form of suitable storage system for data entries (e.g., data entries 152A-158A, 152B-157B), for example, a relational database. The data in data source 150 and data caches 140 and 160 may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, data in data source 150 and data caches 140 and 160 may be stored in a database organized as a formal database with a schema such as a relational schema with defined tables, indices, links, triggers, various commands etc. In some examples, data source 150 and data caches 140 and 160 may not be organized as a formal database, but may instead be an alternative storage structure capable of holding the information stored in data source 150 and data caches 140 and 160 including but not limited to a file, folder, directory, registry, array, list, etc.

In an example, data cache 140, and load balancer service 145A execute on load balancer VM 114 which executes on node 110. The system 100 may include one or more interconnected hosts (e.g., nodes 110 and 112). Each of nodes 110 and 112 may in turn include one or more physical processors (e.g., CPU 120A-D) communicatively coupled to memory devices (e.g., MD 125A-C) and input/output devices (e.g., I/O 130A-B). As used herein, physical processor or processors (Central Processing Units "CPUs") 120A-D refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 125A-C refers to a volatile or non-volatile memory device, such as RAM, ROM, EEPROM, or any other device capable of storing data. Each node may also include input/output ("I/O") devices (e.g., I/O 130A-B) capable of providing an interface between one or more processor pins and an external device, the operation of which is based on the processor inputting and/or outputting binary data. CPUs 120A-D may be interconnected using a variety of techniques, ranging from a point-to-point processor interconnect, to a system area network, such as an Ethernet-based network. Local connections within each of nodes 110 and 112, including the connections between a processor 120A and a memory device 125A-B and between a processor 120A and a I/O 130A may be provided by one or more local buses of suitable architecture, for example, peripheral component interconnect (PCI).

In computer systems (e.g., system 100), it may be advantageous to scale application deployments by using isolated guests such as virtual machines and/or containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a VM may be a robust simulation of an actual physical computer system utilizing a hypervisor (e.g., hypervisor 190) or a component (e.g., a virtual machine manager) that executes tasks commonly executed by hypervisors to allocate physical resources to the virtual machine. In an example, load balancer VM 114 may be a virtual machine executing on top of physical hosts (e.g., node 110), possibly with a hypervisor 190 executing between the virtualized layer and the physical hosts. In an example, data cache 140, and for load balancer service 145A may be further virtualized (e.g., in a container).

System 100 may run one or more VMs (e.g., load balancer VM 114) by executing a software layer (e.g., hypervisor 190) above the hardware and below the load balancer VM 114, as schematically shown in FIG. 1. In an example, the hypervisor 190 may be a component of a host operating system executed by the system 100. In another example, the hypervisor 190 may be provided by an application running on the host operating system, or may run directly on the node 110 without an operating system beneath it. The hypervisor 190 may virtualize the physical layer, including processors, memory, and I/O devices, and present this virtualization to load balancer VM 114 as devices, including virtual processor ("VCPU") 184, virtual memory device 186, and virtual I/O ("VI/O") 188. In an example, load balancer VM 116 may be another virtual machine, executing on node 112, without a dedicated hypervisor. For example, node 112 may execute an operating system supporting virtualization without a full hypervisor module. In the example, VCPU 185, virtual memory device 187, and VI/O 189 provide virtualized compute resources of node 112 to load balancer VM 116.

In an example, VMs 114 and 116 may be virtual machines and may execute guest operating systems which may utilize the underlying virtual central processing unit ("VCPU") 184 or 185, virtual memory device ("VIVID") 186 or 187, and virtual I/O 188 or 189. Data caches 140 and 160, and load balancer services 145A-B may run as applications on VMs 114 and 116 or may be further virtualized and execute in containers. In an example, processor virtualization for load balancer VM 114 may be implemented by the hypervisor 190 scheduling time slots on one or more physical processors (e.g., CPU 120A-B) such that from the guest operating system's perspective those time slots are scheduled on a virtual processor 184. In an example, VCPU 184 may be bound to execute on a specific physical processor in node 110. For example, instructions for VCPU 184 may execute on CPU 120A.

VMs 114 and 116 may run on any type of dependent, independent, compatible, and/or incompatible applications on the underlying hardware and host operating system. In an example, data caches 140 and 160, data cache services 147A-B, and load balancer services 145A-B running on VMs 114 and 116 may be dependent on the underlying hardware and/or host operating system. In an alternative example, data caches 140 and 160, data cache services 147A-B, and load balancer services 145A-B running on VMs 114 and 116 may be independent of the underlying hardware and/or host operating system. In an example, data caches 140 and 160, data cache services 147A-B, and load balancer services 145A-B running on VMs 114 and 116 may be compatible with the underlying hardware and/or host operating system. Additionally, data caches 140 and 160, data cache services 147A-B, and load balancer services 145A-B may be incompatible with the underlying hardware and/or OS. In an example, data caches 140 and 160, data cache services 147A-B, and load balancer services 145A-B may be implemented in any suitable programming language (e.g., Java, C, C++, C-sharp, Visual Basic, structured query language (SQL), Pascal, common business oriented language (COBOL), business process execution language (BPEL), business process model notation (BPMN), complex event processing (CEP), jBPM, Drools, etc.). The hypervisor 190 may manage memory for the host operating system as well as memory allocated to the load balancer VM 114 and guest operating systems.

Figure 2A:
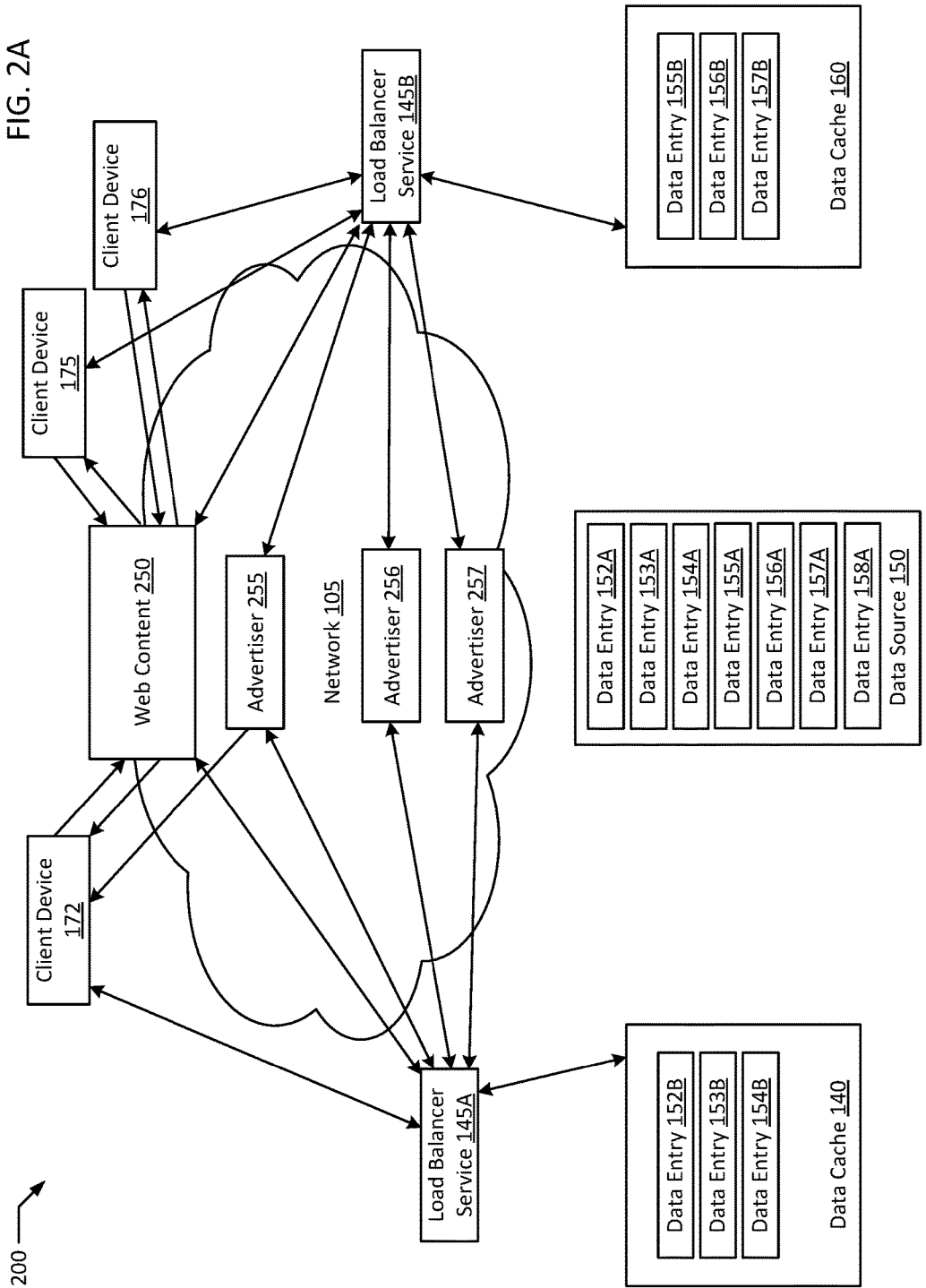
Figure 2B:
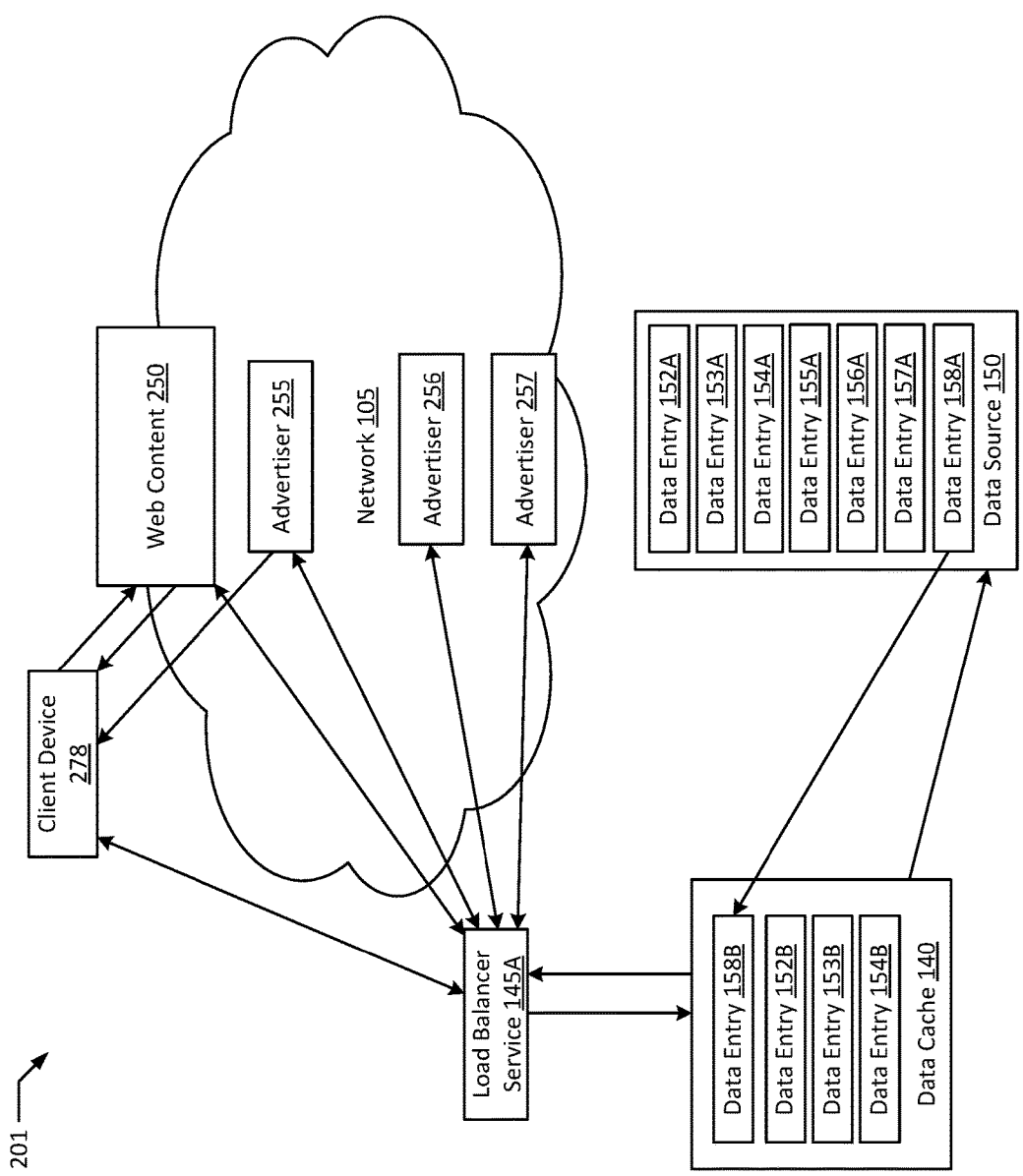

FIGS. 2A-C are block diagrams of an advertisement bidding system enhanced by a low-latency high-throughput scalable data caching system according to an example of the present disclosure. In an example, illustrated system 200 on FIG. 2A may be an embodiment of system 100 where load balancer services 145A-B and data caches 140 and 160 are associated with an ad agency that conducts ad auctions. In an example, client devices 172, 175, and 176 access web content 250, for example, a video streaming service. In the example, a publisher of web content 250 may configure ad slots in web content 250 which may become ad impressions for a client device (e.g., client device 172) when client device 172 loads web content 250. In the example, an ad impression may be configured to solicit a bid from the ad agency operating load balancer services 145A-B in client device 172's local geographical region to conduct advertisement bidding. In the example, upon receiving an ad request from client device 172, load balancer service 145A may access data cache 140 (e.g., via data cache service 147A) to retrieve data entry 152B associated with client device 172. In the example, load balancer service 145A may then modify the ad request from client device 172 by enriching the ad request with user profile data from data entry 152B (e.g., demographic data, purchase history, etc.). Load balancer service 145A may then send the modified ad request to advertisers 255-257 to solicit bids on the ad impression. In an example, load balancer service 145B may be another instance of load balancer 145A in the same geographical region associated with a different data cache 160, and client devices 175 and 176 may have established sessions for ad bidding with load balancer service 145B instead of load balancer service 145A. In an example, the load balancer service instance (e.g., load balancer services 145A-B) a given client device (e.g., client devices 172, 175, or 176) connects to may be based on any suitable method, (e.g., random distribution, round robin, etc.). In an example, once a given client device (e.g., client devices 172, 175, or 176) connects to a given load balancer service instance (e.g., load balancer services 145A-B), that connection may be maintained for an extended period of time (e.g., a session) so that additional requests from the same client device and load balancer service pairing arrive at the same load balancer service instance (e.g., load balancer services 145A-B) and the same data cache (e.g., data cache 140 or 160).

In an example, illustrated system 201 in FIG. 2B may be a later point in time in system 200 with respect to FIG. 2A. In the example, a new client device 278 establishes a session with load balancer service 145A based on accessing web content 250 and generating an ad request to load balancer service 145A in response to an ad impression from web content 250. In the example, data cache 140 had not previously cached data entry 158B associated with client device 278, and so when load balancer service 145A queries data cache 140 for data entry 158B, data cache 140 in turn queries data source 150 to retrieve data entry 158B. Data source 150 responds with data entry 158B which is then stored by data cache 140 and passed through to load balancer service 145A. In an example, load balancer service 145A performs translation on the ad request from client device 278. For example, load balancer service 145A may receive an ad request from client device 278 indicating a size of an ad impression, a type of ad impression (e.g., video, image, animated gif, audio, etc.), and/or a publisher of web content 250. In the example, advertisers 255-257 may implement differently formatted bid requests. In a simple example, an account identifier for a publisher of web content 250 (which may be different for each of advertisers 255-257) may be added to the ad request from client device 278. In an example, translation of an ad request may additionally include enrichment by adding profile data (e.g., demographic data, purchase history data, etc.) to the ad request resulting in an enriched ad bid request that may then be sent to advertisers 255-257. In the example, advertiser 255 wins the auction and sends an ad to client device 278.

In the example, the additional query from data cache 140 to data source 150 may add 5-20 ms as compared to the direct response from data cache 140 in system 200 for data entry 152B. However, with data entry 158B now cached, the extra retrieval is a one time delay and on the next page of content that client device 278 navigates to, data cache 140 will have data entry 158B ready to be delivered. Also, because the vast majority of data requests are handled by the data caches (e.g., data caches 140 and 160) rather than data source 150, the penalty incurred for querying data source 150 is significantly reduced due to the significantly reduced likelihood of queued up queries on data source 150. For example, a query that may take 100 ms without caching may take 30 ms due to caching. In the example, after client device 278 establishes a session with load balancer service 145A, every request from client device 278 during the session may be routed to load balancer service 145A instead of other copies of the load balancer service, and therefore the profile data associated with client device 278 (e.g., data entry 158B) will be readily available cached in, for example, DRAM on the same server (e.g., node 110) as the one hosting load balancer service 145A. In an example, a local retrieval of data (e.g., from data source 150) may allow load balancer service 145A to still respond to client device 278's bid in time to meet a bidding timeout. In the example, by shifting the majority of the data query load to data caches (e.g., data caches 140 and 160), only a small minority of queries may reach data source 150, therefore removing database query latency on data source 150 as a bottleneck for the requests served by load balancer services 145A-B. For example, if 100 ads are served in an average browsing session, data source 150 is queried once instead of 100 times.

In an example, illustrated system 202 in FIG. 2C may be a further progression of system 201 at a later time, where client device 278 acts on the ad served by advertiser 255 and makes a purchase from retailer 290. In the example, after client device 278 makes a purchase, retailer 290 may notify advertiser 255 of the purchase, for example, to pay a commission on the sale. In various examples, retailer 290 and/or advertiser 255 may then notify the ad agency operating load balancer service 145A of the successful ad placement in order for the ad agency to update the profile of the user of client device 278. In an example, the ad agency may operate a dedicated update interface, or load balancer service 145A may receive the profile update. In some examples, updated profile data may be directly updated in data entry 158B. However, in many examples, one individual purchase may have minimal impact on a given user's profile, and therefore the profile update may instead be processed and updated in data source 150 resulting in an updated data entry 158C in data source 150. In an example, a profile service associated with data source 150 may process the update notification from advertiser 255 to make the appropriate changes to data entry 158A. In an example, data entry 158C may then be updated to data cache 140 replacing data entry 158B. For example, data entries may be updated on a given time interval, or when a new session is established from client device 278. In an example, reducing updates to data cache 140 may reduce the frequency of locks on the data in data cache 140, thereby improving read performance.

Figure 3C:
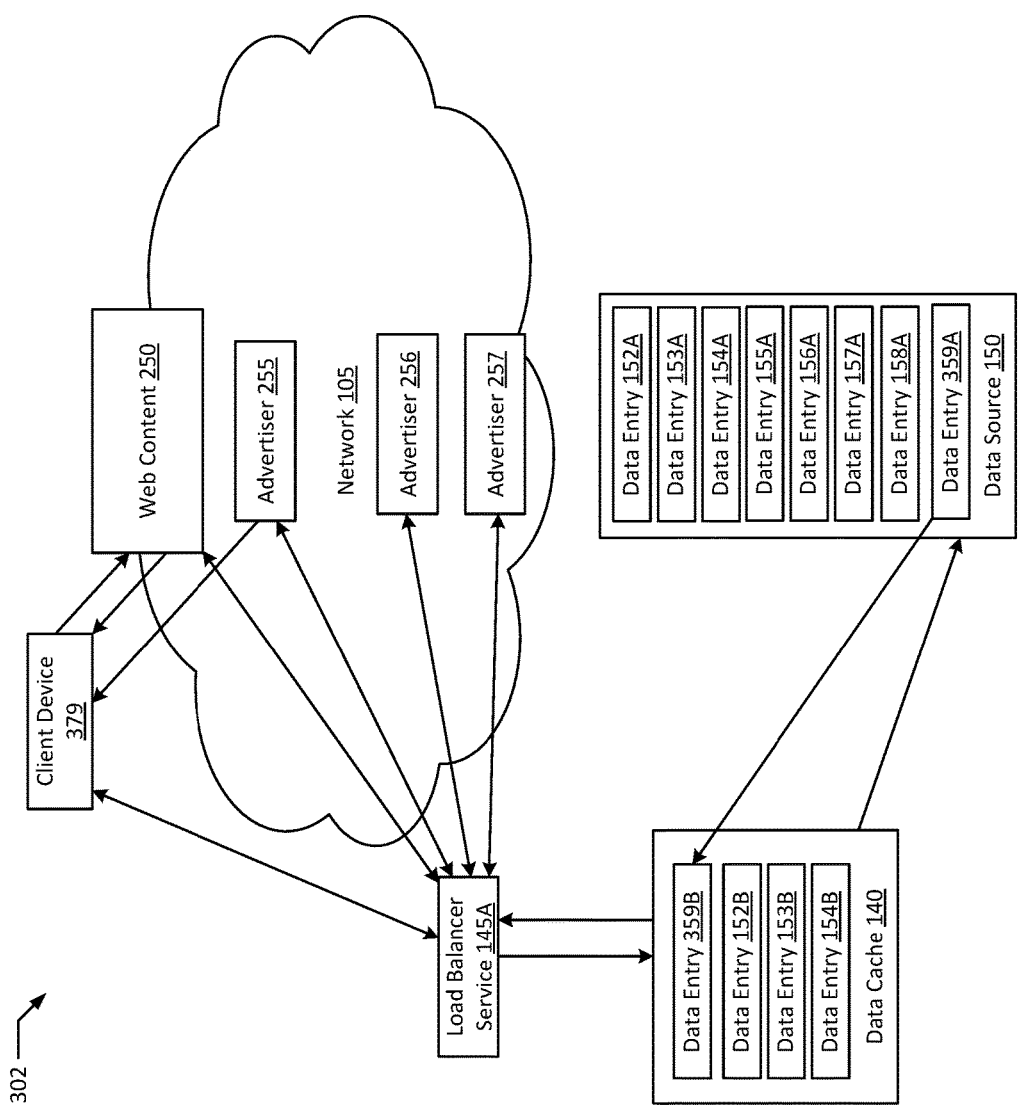

FIGS. 3A-C are block diagrams of a low-latency high-throughput scalable data caching system responding to a request for non-cached data according to an example of the present disclosure. In an example, illustrated example system 300 on FIG. 3A, may be the same system as systems 100 and 200, where client device 379 may be a client device of a user who is traveling. For example, system 100 may be located in New York City, and data source 150 may store data entries (e.g., data entries 152A-158A) of users who reside in the New York City metropolitan area. In the example, client device 379 may belong to a user traveling from California. When the user arrives in New York City with client device 379, the user accesses web content 250 resulting in load balancer service 145A receiving an ad request. Load balancer service 145A may then reject the request (e.g., by ignoring the request and letting it time out) due to both data cache 140 and data source 150 lacking a matching data entry for client device 379.

In an example, illustrated system 301 in FIG. 3B is system 300 after data source 150 receives the query for a data entry corresponding to client device 379 (or the user of client device 379). In an example, upon failing to locate a corresponding data entry, data source 150 in geolocation 380 (e.g., New York City) may contact a master data source 350 in geolocation 385 (e.g., Houston, Tex.) over network 105 to retrieve data entry 359 associated with client device 379. In an example, master data source 350 may be a regional or national backup database that stores data entries from multiple geolocations (e.g., geolocations 380 and 385). For example, master data source 350 may be a collection of servers and/or storage nodes that combine to form a definitive master data store. In an example, master data source 350 may be implemented with high capacity storage that may be slower to access than data source 150 and/or data cache 140. In the example, querying master data source 350 may require upwards of 100 ms, at which point load balancer service 145A may likely miss a deadline for responding to client device 379's ad request.

In an example, illustrated system 302 in FIG. 3C is system 301 after data source 150 retrieves data entry 359 as data entry 359A. In the example, client device 379 encounters a new ad impression on a second page of web content 250, resulting in a new ad request to load balancer service 145A. In an example, a new ad impression does not require loading a new page of content. For example, in a long form article a first ad impression may be a banner ad at the top of the page, while a second ad impression may be encountered as a user scrolls down the page in the form of a video midway through the article. In an example, data source 150 may push data entry 359A to data cache 140 as soon as it is retrieved. In another example, data cache 140 may retrieve data entry 359A as data entry 359B when the second ad request is received. In either example, data cache 140 responds to load balancer service 145A with data entry 359B, which allows load balancer service 145A to translate and enrich the ad request from client device 379. The enriched request is then sent to advertisers 255-257 resulting in a winning bid from advertiser 255 and an ad delivered by advertiser 255 to client device 379. In some examples, rather than direct delivery of the ad from advertiser 255, load balancer service 145A may deliver the ad after determining a winning bidder. In the example, a second data cache (e.g., on node 110) may include advertisement files for commonly displayed ads for advertisers 255-257, and a bid response from advertiser 255 may include instructions to display a preselected ad should advertiser 255 provide a winning bid. In an example, load balancer service 145A serving a cached ad may incur lower latency than providing a notification to advertiser 255 of its winning bid and then having advertiser 255 serve the ad directly.

Figure 4:
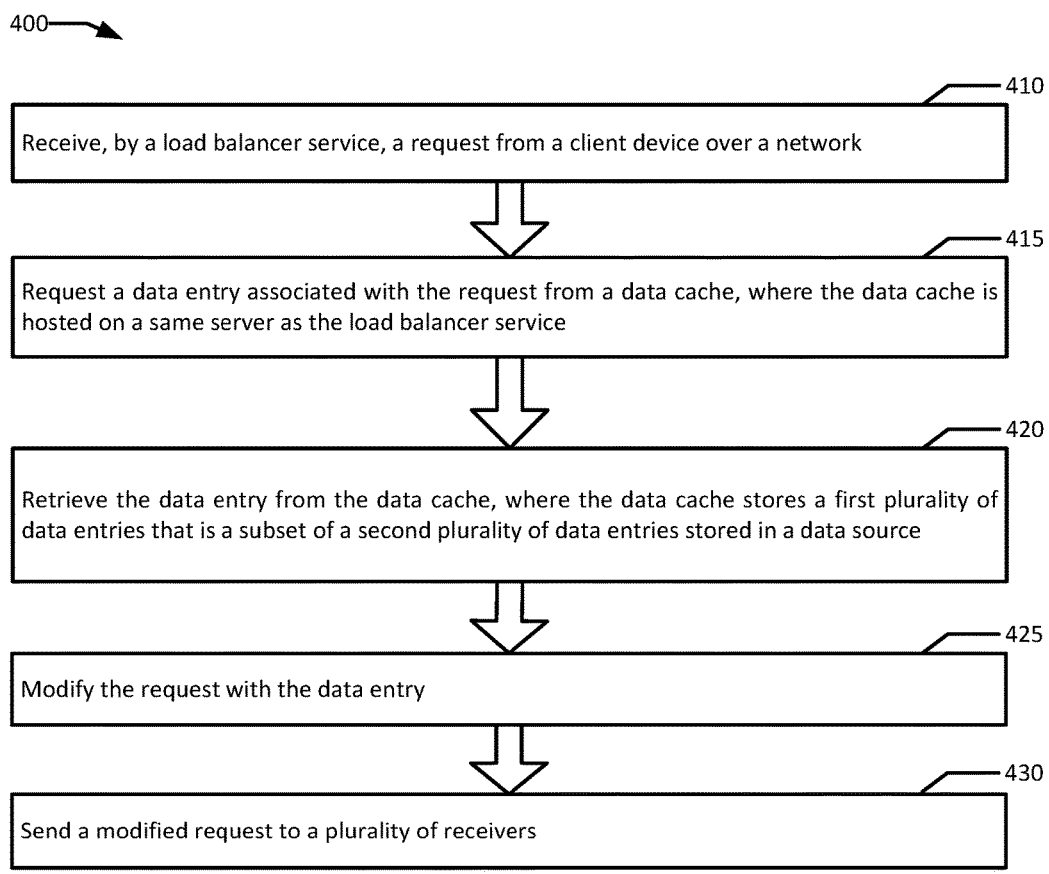
FIG. 4 is a flowchart illustrating low-latency high-throughput scalable data caching according to an example of the present disclosure.

FIG. 4 is a flowchart illustrating low-latency high-throughput scalable data caching according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method is performed by data cache 140 and load balancer service 145A.

Method 400 may include receiving, by a load balancer service, a request from a client device over a network (block 410). In an example, load balancer service 145A receives an ad request from client device 172 over network 105. In an example, the ad request is generated by client device 172 in response to an advertisement impression based on accessing web content 250 and data entry 152B is a profile associated with client device 172. In an example, each new request from client device 172 during an extended time interval (e.g., a session) from client device 172 to an ad agency operating load balancer services 145A-B is processed by load balancer service 145A instead of any other load balancer service (e.g., load balancer service 145B). In the example, once a session is established with one load balancer service, the session maintains use of that same load balancer service instance. In an example, load balancer services 145A-B may sit behind a web portal presenting a unified universal resource locator "URL" to network 105. In an example, load balancer services 145A-B may have separate IP addresses. In an alternative example, load balancer service 145A may be implemented as part of a video hosting service, where client device 172 requests that load balancer service 145A suggest a new video to watch.

The load balancer service requests a data entry associated with the request from a data cache, where the data cache is hosted on a same server as the load balancer service (block 415). In an example, load balancer service 145A requests data entry 152B associated with the request from client device 172 from data cache 140, which is located on node 110 (and also load balancer VM 114) along with load balancer service 145A. In an example, load balancer VM 114 and/or node 110 may host multiple copies of load balancer service 145A which may share data cache 140. In another example, multiple data caches may be hosted on node 110. In an example, multiple load balancer services (e.g., load balancer service 145A and another load balancer service hosted on node 110) may simultaneously query data cache 140. In the example, querying data cache 140 does not lock the data storage containing data cache 140, thereby allowing multiple simultaneous reads from data cache 140. For example, data cache 140 may remain unlocked and therefore query-able by a second load balancer service instance on node 110 while responding to the retrieval request for data entry 152B by load balancer service 145A. In the alternative video hosting example, load balancer service 145A may request a data entry 152B that includes profile data with content preferences of a user of client device 172.

The data cache service retrieves the data entry from the data cache, where the data cache stores a first plurality of data entries that is a subset of a second plurality of data entries stored in a data source (block 420). In an example, a data cache service 147A retrieves data entry 152B from data cache 140, which stores data entries 152B-154B, a subset of data entries 152A-158A stored by data source 150. In an example, data entries 152B-154B on data cache 140 and data entries 155B-157B on data cache 160 are stored in random access memory (e.g., DRAM or persistent memory) for faster access. In an example, where data entry 152B is not present in data cache 140 when load balancer service 145A queries data cache 140, data cache 140 and/or data cache service 147A may retrieve data entry 152A from data source 150 as data entry 152B. In an example, data cache 140 and data cache 160 store different pluralities of data entries (e.g., data entries 152B-154B vs. data entries 155B-157B). In an example, data caches 140 and 160 may have partially overlapping data entries. For example, later in the day, client device 172 may establish a new session and may be assigned to load balancer service 145B, causing data cache 160 to retrieve data entry 152A (or an updated version) from data source 150.

In an example, data source 150, data caches 140 and 160, and load balancer VMs 114 and 116 may all be located in the same data center, for example, in geolocation 380 (e.g., New York City). In an example, one data source (e.g., data source 150) may be deployed in one regional data center serving a geographically or population defined region. For example, a data center in New York City may have a service range covering New Jersey and Connecticut, while a data center in Salt Lake City, Utah may serve most of the Rocky Mountain States. In an example, the number of load balancer VMs (e.g., load balancer VMs 114 and 116) in a given data center may be scaled dynamically based on demand. In the example, a load balancer VM may be instantiated in a few minutes. In an example, a given load balancer VM may host multiple instances of a load balancer service (e.g., load balancer service 145A), for example, based on the number of network interfaces available to the load balancer VM. In an example, a data cache may serve multiple load balancer service instances. In an example, a given data source (e.g., data source 150) may support dozens of load balancer VMs (e.g., load balancer VMs 114 and 116) and data caches (e.g., data cache 140 and 160). In an example, data source 150 may be deployed as part of a load balanced and/or fault tolerant cluster with multiple nodes.

In an example, a master data source 350 may be located in geolocation 385 (e.g., Houston, Tex.), and the master data source 350 may store more data entries than data source 150. For example, master data source 350 may be a long term backup storage for data entries from different regional hosting locations including geolocation 380 (e.g., backup for data entries 152A-158A). In an example, master data source 350 may be a backup array updated periodically from data source 150. In an example, data source 150 may be configured to execute a backup of data entries 152A-158A while data source 150 is executing. For example, data source 150 may respond to a request for data entry 158A while a backup is executing. In the example, backups of data source 150 may be taken in binary format, for example, to avoid blocking queries to data source 150. In the example, a binary backup of data source 150 may then be converted into a format that may be uploaded into a storage node (e.g., master data source 350) which may be a relational database or any other suitable form of accessible high capacity storage. In an example, data from master data source 350 may be further archived for long term storage. In some examples, due to the transient nature of the data stored, master data source 350 may instead purge entries that are aged over a certain time period (e.g., 30 days without access). In some examples, master data source 350 may be enforced to be in a different geographical region from the data sources master data source 350 backs up for additional fault tolerance. For example, backing up New York City data in Houston, Tex. may be more secure than backing up New York City data in Secaucus, N.J., since a regional disaster (e.g., power outage, hurricane, earthquake, etc.) is unlikely to affect both the data source 150 and the master data source 350 if they are geographically separate. In such an example, if a regional event affects New York City, unaffected users who would typically connect to the New York City nodes may be rerouted to a next nearest node (e.g., in Baltimore, Md.) which may retrieve data from master data source 350. In an example, a given master data source 350 may support dozens of data source nodes.

The load balancer service modifies the first request with the first data entry (block 425). In an example, load balancer service 145A modifies the ad request from client device 172 with profile data from data entry 152B. In various examples, profile data from data entry 152B may include account, demographic, purchase history, browsing history, shopping cart, and other forms of data that may allow advertisers 255-257 to better assess the value of a given ad impression. In an example, data entries 152A-158A may be compiled from any suitable data gathering technique, such as web surveys, web cookies, etc. In an example, the modified request sent by load balancer service 145A to advertisers 255-257 may be a solicitation for bids on the ad impression on client device 172 that triggered the ad request to load balancer service 145A. In the alternative video hosting example, load balancer service 145A may send out requests to several video streaming servers based on the content preferences in data entry 152B. For example, the video hosting service may be implemented with video storage nodes segregated by contents. In the example, load balancer service 145A may send requests to an animal video node, a do-it-yourself video node, and a standup comedian node based on data entry 152B. In the example, final selection of a recommendation may be based on, for example, available capacity (e.g., CPU, network bandwidth, etc.) in each of the hosting nodes reported back to load balancer service 145A.

The load balancer service sends a first modified request to a plurality of receivers (block 430). In an example, load balancer service 145A selects a plurality of receivers (e.g., advertisers 255-257) to receive the advertisement bidding request. For example, advertisers 255-257 may be selected based on preferences selected by a publisher of web content 250. In another example, advertisers 255-257 may be selected based on profile data in data entry 152B. For example, advertiser 255 may represent apparel company, advertiser 256 may represent fitness centers, and advertiser 257 may represent sporting goods companies. In an example, for a user of client device 172 who is an avid fitness enthusiast, advertisers 255-257 may be selected based on profile data in data entry 152B. In an example, advertiser 255 wins the bidding and serves and advertisement to client device 172. In an alternative example, a computer gaming enthusiast may instead have bids sent to advertisers who represent computer hardware companies and video game producers.

In an example, an update request may originate from a client device 278 to update data entry 158A in data source 150. For example, client device 278 may make a purchase from retailer 290 based on an advertisement from advertiser 255. In the example, client device 278, retailer 290, and/or advertiser 255 may notify the ad agency operating system 200 of the purchase to update data entry 158A (e.g., resulting in data entry 158C). In the alternative video hosting example, client device 172 may indicate that the user of client device 172 viewed the recommended video favorably or disfavorably, thereby updating data entry 152A resulting in more accurate future recommendations. In an example, the modified request from load balancer service 145A (e.g., ad bid solicitation, video recommendation request, etc.) may generate a reply to load balancer service 145A and/or client device 172 that then results in an update request being received by data source 150 (e.g., a purchase confirmation, a vote on a video, etc.). In an example, an update request may include a web cookie.

In various examples, data cache 140 may be updated synchronously or asynchronously with data source 150. For example, data cache 140 may be updated based on an update data request from data cache 140 to data source 150 to pull in new changes, or data source 150 may issue an update push sending newly changed data to data cache 140. In an example, a new session may be established after client device 278 has disconnected, triggering an update request from data cache 140 to pull in new changes to data entry 158B. In another example, data source 150 may periodically (e.g., every 10 minutes) push data updates for active sessions to the respective data caches serving those sessions. In the advertisement example, a failure to update data cache 140 may, for example, result in a repeat advertisement for the item that was just purchased, but one change to data entry 152A is unlikely to dramatically affect the bidding profile for ads for client device 278, and therefore a certain degree of staleness for data entry 158B may be tolerable in exchange for reducing writes to data cache 140, thereby improving read performance. However, in the video hosting example, a negative vote and/or a request to skip a recommended video may demand immediate reconciliation to deliver new content that may hold the attention of the user of client device 172 longer (thereby generating more potential ad impressions). In such an example, an updated profile may be immediately pushed to data cache 140 when ready.

In an example, a given client device's data entry (e.g., data entry 359 associated with client device 379) may not be present in either data cache 140 or data source 150. In an example, retrieving data entry 359 from master data source 350 may incur enough of a latency penalty that load balancer service 145A rejects the request from client device 379. For example, data cache 140 may respond to load balancer service 145A with a termination request based on failing to locate data entry 359 in data source 150, to avoid load balancer service 145A waiting for a timeout. In another example, load balancer service 145A may timeout the request from client device 379 based on a timeout setting indicating a time limit by which it is unlikely that load balancer service 145A could respond to client device 379 in time after waiting for responses to ad bid solicitation requests to advertisers 255-257. In an example, data entry 359 is retrieved to data source 150 and then propagated to data cache 140 in time for a second request from client device 379 to load balancer service 145A.

In an example, upon a failure of data source 150, the contents of data source 150 may be restored. For example, the contents of data source 150 may, upon reinitialization of data source 150, be restored from each of the data caches (e.g., data caches 140 and 160) associated with data source 150. In the example, additional data entries may be retrieved from master data source 350 as a background process, based on, for example, geographical location data of the data entries. In an example, restoration from data caches 140 and 160 may be orders of magnitude faster than from master data source 350. In an example, on failure of load balancer VM 114, the VM may be relaunched with a blank data cache 140, which may be rebuilt in an on demand basis as new sessions connect to the relaunched load balancer service 145A. In an example where data cache 140 fails but the rest of load balancer VM 114 is stable, data cache 140 may be restored from data source 150 base on, for example, a manifest of the data entries (e.g., data entries 152B-154B) stored in data cache 140. In an example, a subset of frequent users and/or frequent client devices may have their respective data entries pre-loaded into newly launched load balancer VMs and data caches.

Figure 5:
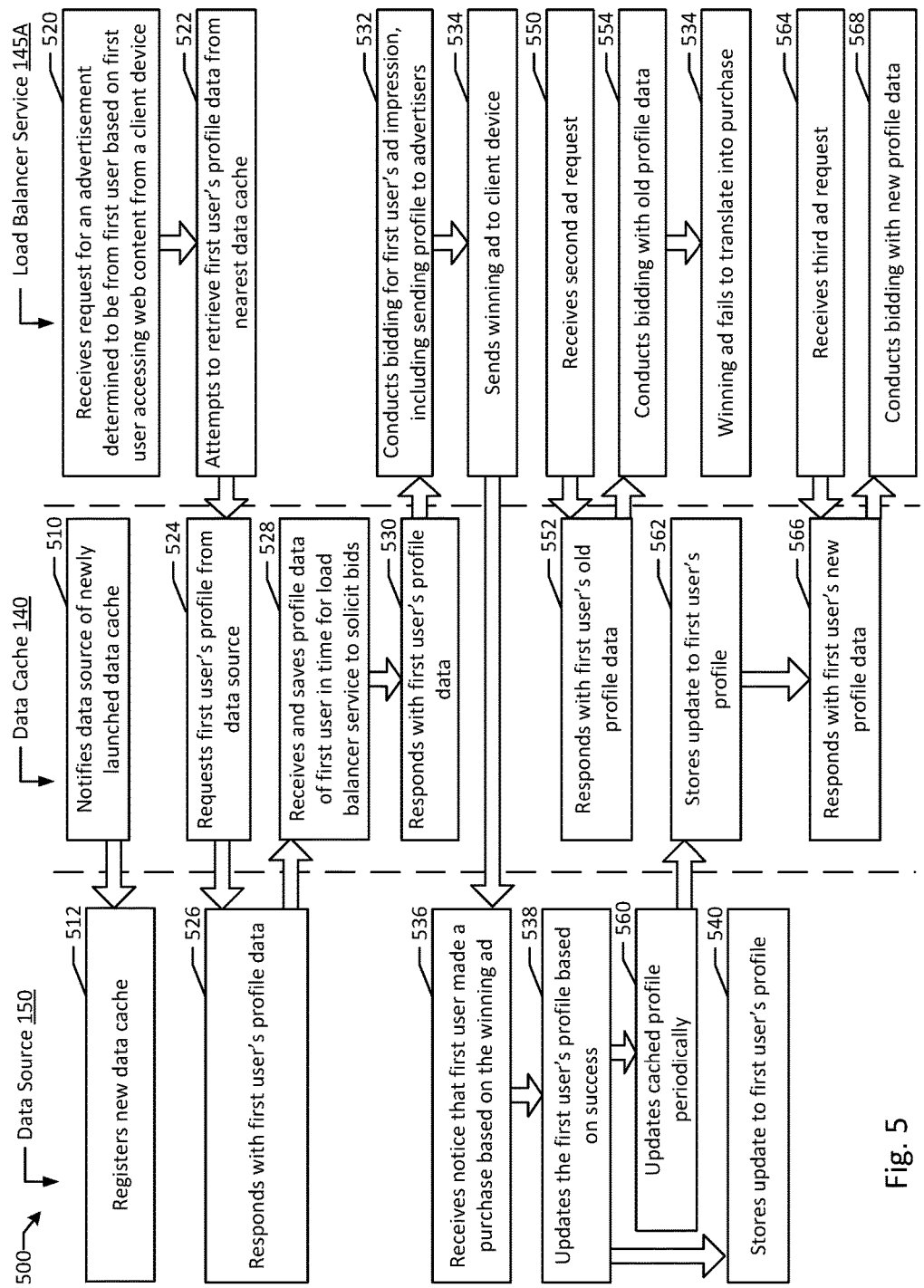
FIG. 5 is a flow diagram illustrating low-latency high-throughput scalable data caching reducing latency in an advertisement bidding system according to an example of the present disclosure.

FIG. 5 is a flow diagram illustrating low-latency high-throughput scalable data caching reducing latency in an advertisement bidding system according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 500, a data source 150, a data cache 140, and a load balancer service 145A combine to lower latency for request response.

In system 500 as illustrated in FIG. 5, data cache 140 notifies data source 150 that data cache 140 is a newly launched data cache (block 510). In the example, data cache 140 may be launched on a new load balancer VM 114, which may also host load balancer service 145A. In an example, data source 150 registers data cache 140 as a newly associated data cache, for example, after an authentication and handshake process (block 512). In an example, load balancer service 145A receives a request for an ad that is determined to be from a first user based on the user accessing web content 250 from client device 278 (block 520). In the example, load balancer service 145A attempts to retrieve the user of client device 278's profile data from data cache 140 (block 522). In an example, data cache 140 may pass the request for the user of client device 278's profile on to data source 150, for example, after failing to locate data entry 258B within data cache 140 (block 524). In an example, data source 150 responds to data cache 140 with data entry 158A with the user of client device 278's user profile data (block 526). In an example, data cache 140 receives data entry 158A and saves it as data entry 158B in time to respond load balancer service 145A and allow load balancer service 145A to solicit bids for the ad request from client device 278 (block 528). In an example, data cache 140 responds to load balancer service 145A with data entry 158B containing the user of client device 278's profile data (block 530).

In an example load balancer service 145A conducts bidding for client device 278's ad impression, including sending profile information from data entry 158B to advertisers 255-257 (block 532). In an example, advertiser 255 generates a winning bid and load balancer service 145A serves the winning ad to client device 278 (block 534). In an example, data source 150 receives a notice from load balancer service 145A that the user of client device 278 made a purchase based on the winning ad (block 536). In the example, data source 150 updates data entry 158A to data entry 158C based on the successfully converted ad placement (block 538). In the example, the updated profile of the user of client device 278 is stored by data source 150 as data entry 158C (block 540).

Meanwhile, load balancer service 145A receives a second ad request from client device 278 (block 550). When queried by load balancer service 145A, data cache 140 responds with previously cached data entry 158B (e.g., a copy of data entry 158A) due to not having received updated data entry 158C (block 552). In an example load balancer service 145A conducts bidding for the second ad impression based on the old profile data in data entry 158B (block 554). In an example, a winning ad is again delivered to client device 278, but the winning ad fails to convert into a purchase (block 534). In some circumstances, old profile data may lead to sub-optimal results. For example, due to the old profile data in use, client device 278 may have been served an ad for a competitor of the product purchased based on the first ad. However, in the vast majority of circumstances, a user will not have immediately previously made a purchase that directly impacts the necessity of a subsequent ad. Therefore, in most circumstances, optimizing chances of a winning bid on each ad impression by reducing latency is preferable. In an example, because of the enrichment process, a winning bid was still entered by an advertiser contacted by load balancer service 145A as compared to other competing load balancer services even though the profile data was aged. In an alternative example, the second ad request may be won by an ad for a completely unrelated product that is still desirable to the user of client device 278.

In an example, data source 150 periodically updates cached profile data in data cache 140 (block 560). In the example, after responding to the second request for data entry 158B, data cache 140 saves the updated profile data entry from data source 150 (e.g., data entry 158C) (block 562). In an example, load balancer service 145A receives a third ad request from client device 278 (block 564). In the example, data cache 140 sends the updated profile data (e.g., the copy of data entry 158C) to load balancer service 145A (block 566). In an example, load balancer service 145A conducts the third round of bidding with the updated profile data (block 568).

Low-latency high-throughput scalable data caching takes a data enrichment step if request translation that typically includes a database query requiring 10-100 ms, and replaces that database query with a call to a local in-memory cache that takes under 1 ms, thereby reducing the latency penalty of enrichment by, for example, an order of magnitude. By splitting the query load away from a data source database, performance on the data source database generally sees marked improvements. For example, rather than 100 queries from 10 different client devices hitting the data source database, each of the 10 client devices may result in at most 1 query from a data cache to the data source to retrieve and cache the profile data of that client device, with subsequent queries handled by the data cache associated with the load balancer service maintaining a session with the respective client device. In the example, even though the caches are still populated from the data source, the queries handled by the data source may be reduced by a factor of 100, and therefore the likelihood of queued requests or requests affected by blocking on the database are dramatically reduced. By implementing a data source also as an in-memory database, and only having a master data source in true persistent storage, query times may be additionally enhanced. Especially in implementations such as ad bidding where the cost of failure on one individual request is very low, reactive caching of profile data may offer significant performance advantages for data retrieval at a relatively minor cost. For example, in a typical browsing session, a client device may generate 200-1000 ad impressions (e.g., 5-15 ad impressions on a given page). In an example where a traveling device has a profile that is not stored regionally at all in a data source, the some of the first 5-15 ad impressions may be sacrificed due to needing to retrieve the profile from a slow master data source in a different region, but every subsequent page view will have sub millisecond data enrichment available because it would be unlikely for a client device to view a second page in less time than the 100-200 ms it would take to cache a profile from a master data source to a local data cache. Therefore, for the vast majority of the remaining ad impressions in the browsing session, a load balancer service would experience a dramatic performance boost.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
    a data source comprising a processor communicatively coupled with a memory connected over a network to a plurality of load balancer servers including a first load balancer server and a second load balancer server, wherein each load balancer server of the plurality of load balancer servers has a respective data cache, including a first data cache of the first load balancer server and a second data cache of the second load balancer server; and
    a load balancer service and a data cache service executing on one or more processors on the first load balancer server to:
    receive, by the load balancer service, a first request from a first client device over the network;
    request, by the load balancer service, a first data entry associated with the first request from the data cache service;
    retrieve, by the data cache service, the first data entry from the first data cache, wherein the first data cache stores a first plurality of data entries that is a first subset of a second plurality of data entries stored in the data source;
    modify, by the load balancer service, the first request with the first data entry;
    send, by the load balancer service, the modified first request to a plurality of receivers; and
    reject, by the load balancer service, a second request from a second client device based on the data cache service failing to locate a second data entry associated with the second request in the first data cache and also failing to locate the second data entry in the data source.

2. The system of claim 1, wherein the second data cache stores a third plurality of data entries that is a second subset of the second plurality of data entries, and the first plurality of data entries is different from the third plurality of data entries.

3. The system of claim 2, wherein the first load balancer server, the second load balancer server, and the data source are all located in a same data center.

4. The system of claim 3, wherein a master data source stores a fourth plurality of data entries, the second plurality of data entries is a third subset of the fourth plurality of data entries, and the master data source is located in a separate geographical region from the data source.

5. The system of claim 4, wherein the master data source is a backup array updated periodically from the data source.

6. The system of claim 1, wherein the first data entry is updated in the data source based on a first update request from the first client device.

7. The system of claim 6, wherein the first update request is generated by the first client device in response to a reply to the first modified request.

8. The system of claim 6, wherein the first data entry in the first data cache is updated based on one of a data request from the first data cache to the data store and a update push by the data store.

9. The system of claim 6, wherein the first update request includes a cookie.

10. The system of claim 1, wherein the data cache service retrieves the first data entry from the data source.

11. The system of claim 1, wherein the data source retrieves the second data entry from a master data source based on the second request, and the data source sends the second data entry to the first data cache.

12. The system of claim 1, wherein the first load balancer server receives a third request and the first data cache is queried for a third data entry while executing a first query for the first data entry.

13. The system of claim 1, wherein the data source is configured to execute to a backup of the second plurality of data entries on the data source while the data source responds to the data cache service.

14. The system of claim 13, wherein the backup is taken in a binary form.

15. The system of claim 14, wherein the backup is converted to a format compatible with a relational database and uploaded to a master data source.

16. The system of claim 1, wherein the first plurality of data entries and the second plurality of data entries are stored in random access memory.

17. The system of claim 1, wherein each new request during an extended time interval from the first client device is processed by the load balancer service instead of any other load balancer service on the plurality of load balancer servers.

18. The system of claim 1, wherein upon failure of the data source, a replacement data source is initialized with a third plurality of data entries based on respective pluralities of data entries on respective data caches on the plurality of load balancer servers.

19. The system of claim 1, wherein upon failure of the first load balancer server, a third load balancer server is initialized and the first plurality of data entries is loaded to a third data cache in the third load balancer server.

20. The system of claim 1, wherein the first request is generated by the first client device in response to an advertisement impression and the data entry is a profile associated with the first client device.

21. The system of claim 20, wherein the modified first request is a solicitation for bids for the advertisement impression and a first receiver of the plurality of receivers is an advertiser.

22. The system of claim 21, wherein the advertiser serves an advertisement on the first client device.

23. A method comprising:
    receiving, by a load balancer service, a first request from a first client device over a network;
    requesting a first data entry associated with the first request from a first data cache, wherein the first data cache is hosted on a same server as the load balancer service;
    retrieving the first data entry from the first data cache, wherein the first data cache stores a first plurality of data entries that is a first subset of a second plurality of data entries stored in a data source;
    modifying the first request with the first data entry;
    sending the modified first request to a plurality of receivers; and rejecting, by the load balancer service, a second request from a second client device based on failing to locate a second data entry associated with the second request in the first data cache and also failing to locate the second data entry in the data source.

24. The method of claim 23, wherein a master data source stores a third plurality of data entries, the second plurality of data entries is a third subset of the third plurality of data entries, and the master data source is located in a separate geographical region from the data source and the first data cache.

25. The method of claim 23,
wherein the data source retrieves the second data entry from a master data source based on the second request, and the data source sends the second data entry to the first data cache.

26. The method of claim 23, wherein the first data entry is updated in the data source based on a first update request from the first client device and an updated first data entry is later sent to the first data cache.

27. The method of claim 23, wherein the first data cache retrieves the first data entry from the data source.

28. The method of claim 23, wherein upon failure of the data source, a replacement data source is initialized with a third plurality of data entries based on respective pluralities of data entries on respective data caches on a plurality of load balancer servers associated with the data source.

29. A computer-readable non-transitory storage medium storing executable instructions, which when executed by a computer system, cause the computer system to:
receive, by a load balancer service, a first request from a client device over a network;
request a first data entry associated with the first request from a first data cache, wherein the first data cache is hosted on a same server as the load balancer service;
retrieve the first data entry from the first data cache, wherein the first data cache stores a first plurality of data entries that is a first subset of a second plurality of data entries stored in a data source;
modify the first request with the first data entry;
send the modified first request to a plurality of receivers; and
reject, by the load balancer service, a second request from a second client device based on failing to locate a second data entry associated with the second request in the first data cache and also failing to locate the second data entry in the data source.

* * * * *